Patented Feb. 14, 1933

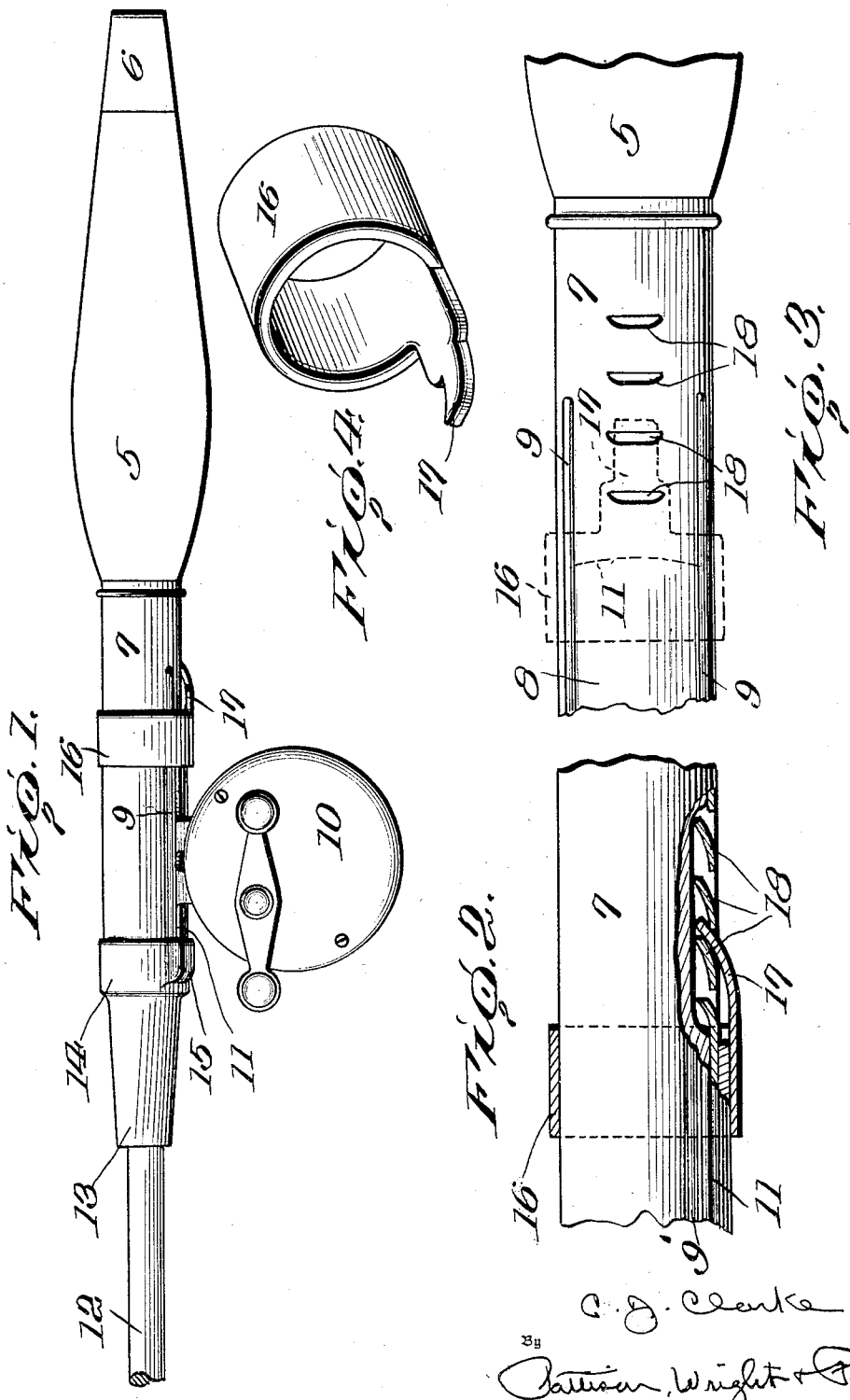

1,897,889

UNITED STATES PATENT OFFICE

CHARLES J. CLARKE, OF KINGSBURG, CALIFORNIA

FISHING ROD

Application filed February 12, 1932. Serial No. 592,621.

This invention relates to improvements in fishing rods, the particular invention being directed to an improved construction for locking the reel upon the rod for holding it firmly against displacement.

The primary object of the invention is the provision of an improved means for locking a reel upon a fishing rod.

A further object of the invention is the provision of an improved means for locking a reel upon a fishing rod, the construction being such that it is applicable to rods now in use by altering them only slightly.

A still further object of the invention is the provision of an improved means for locking a reel upon a fishing rod wherein the construction is simple and cheap of manufacture, highly efficient in operation and has a minimum number of parts which obviates the possibility of some of the parts being lost.

Other specific objects, novel features of construction and improved results of the invention will appear from the following description when read in the light of the accompanying drawing.

In the drawing:

Figure 1 is a view in side elevation of a typical fishing rod and reel construction having the improved invention applied thereto.

Fig. 2 is a fragmentary detail view illustrating the clamping ring, a portion of the figure being broken and shown in vertical section.

Fig. 3 is a fragmentary top plan view of the rod illustrating the clamping ring in dotted lines.

Fig. 4 is an enlarged perspective view of the clamping ring.

The drawing of Fig. 1 illustrates a typical fishing rod and reel construction and by reference to this figure it will be apparent that as in all conventional or well-known types of fishing rods there is a handle or butt 5 which, at its rear end, is finished off with a ferrule 6.

Attached to the butt or handle is a tubular portion 7, upon which is formed a reel seat 8, having at its opposite sides or edges outwardly extending projections or fins 9, which parallel the tubular member.

The reel can be of any desired form or type and is designated in the drawing in its entirety by the numeral 10. The reel is provided with an elongated base 11, which to conform with the tubular portion 7 of the rod and to properly engage the reel seat 8 is arcuate in cross-section. The reel base is of a width to fit between the parallel fins 9, which assist in holding the reel against transverse or axial displacement.

The rod proper is designated at 12 and is secured to the tubular portion 7 by a tapered ferrule 13, having a ring portion 14 surrounding the tubular rod portion. This ring 14 is provided with a raised portion 15 which, as clearly appears in Fig. 1 of the drawing, receives one end of the reel base. In placing the reel upon its seat one end of the reel base is slid beneath the raised portion 15 of the ring. Thereafter a lock ring 16 which surrounds the tubular portion 7 of the rod is advanced over the other end of the reel base. This clamping ring is of a size to loosely fit the tubular portion 7 but to tightly clamp the reel base upon its seat when it is advanced to the position illustrated in Figs. 1 and 2 of the drawing.

The construction thus far defined firmly clamps the reel upon the tubular rod portion, but any displacement of the ring 16 would permit the reel to become displaced from the rod. To guard against this possibility the ring 16 is provided with an outwardly extending and downwardly bent tongue or lug 17, which co-operates with a series of slots of slot-like openings or depressions 18 formed in the tubular portion 7 of the rod. These depressions, as clearly appear in Fig. 2 of the drawing, incline forwardly towards the reel seat with the result that the ring 16 can be easily and readily advanced into a clamping position, but the engagement of the tongue 17 of the clamp ring with a depression prevents the backward or retractive movement of the clamp or lock ring, and it will also be seen that the tongue 17 when in a slot prevents the rotation of the ring. This is clearly illustrated in Fig. 2 of the drawing. A plurality of depressions or slots are provided to enable any desired adjustment of clamping pressure to be exerted by the lock ring 16.

To release the lock ring and permit the removal of the reel, the ring is advanced until the tongue is released, then the ring is rotated until the tongue is positioned at one side of the slots. This will permit the lock ring to be retracted and thus release the end of the reel base.

For efficient operation the tongue 17 should be of spring metal so that it will pass readily over the slots or depressions when the clamping ring is moved into a clamping position and will when the ring is stopped spring downwardly into engagement with the slot.

It will be obvious that the clamping ring and tongue can be made in one piece as would be desirable in the production of new fishing rods. It is, however, equally obvious that the spring tongue could be welded, soldered or otherwise suitably connected to the clamping rings of the fishing rods now in use so as to convert them in accordance with the present invention. In converting the rods now on the market into the form of the present invention, the tongues would be secured to the clamping rings and the depressions or slots provided in the tubular portion 7 of the rod by any suitable tool.

From the foregoing it will be seen that a simple lock, cheap of manufacture yet highly efficient in operation has been provided for retaining a fishing reel upon a fishing rod.

Having thus described my invention, what I claim and desire to secure by Letters Patent is:

1. A reel fastening for fishing rods, comprising a slidable clamping ring provided at its rear edge with an outwardly and downwardly extending tongue, said rod provided with a plurality of aligned teeth arranged longitudinally of the rod and formed by slitting the material of which the rod is formed and bending the front edge of the slit downwardly and inwardly, and said ring tongue adapted upon movement forwardly on said rod to pass freely over said teeth and slits and when moved rearwardly on said rod to enter said slits and extend through the slits to a position under the tooth adjacent the rear edge of the slit, whereby when the tongue is in a slit the ring is locked against longitudinal movement in a rearward direction and against rotation upon the rod.

2. A reel fastening for fishing rods comprising a slidable clamping ring provided at its rear edge with an outwardly extending downwardly curved projecting tongue, said rod provided with a plurality of aligned teeth arranged longitudinally of the rod and formed by slitting the rod and bending the front edge of the slit portion downwardly and inwardly to provide for each tooth an inwardly curved surface adapted to engage the ring tongue when the ring is moved rearwardly, said slit being of a sufficient width to permit entry of the tongue to a point where it projects under an adjacent tooth, said construction permitting said tongue to pass freely over the teeth and slits upon movement of the ring in a forwardly direction and causing said tongue to enter into said slits and extend under an adjacent tooth when the ring is moved in a rearwardly direction, whereby when the tongue is in a slit the ring is locked against longitudinal movement of the rod in a rearwardly direction and is locked against rotation upon the rod.

In testimony whereof I hereunto affix my signature.

CHARLES J. CLARKE.